United States Patent [19]

Kroniger et al.

[11] Patent Number: 4,886,147
[45] Date of Patent: Dec. 12, 1989

[54] BRAKE ARRANGEMENT

[75] Inventors: Wilhelm Kroniger, Friolzheim; Roland Martin, Weissach; Guenter Aydt, Backnang, all of Fed. Rep. of Germany

[73] Assignee: Dr. Ing. H.c.F. Porsche AG, Weissach, Fed. Rep. of Germany

[21] Appl. No.: 286,165

[22] Filed: Dec. 19, 1988

[30] Foreign Application Priority Data

Dec. 19, 1987 [DE] Fed. Rep. of Germany ....... 3743290

[51] Int. Cl.$^4$ ............................................. F16D 65/02
[52] U.S. Cl. .................................................. 188/73.37
[58] Field of Search ............... 188/73.35, 73.36, 73.37, 188/250 B, 250 E, 250 G

[56] References Cited

U.S. PATENT DOCUMENTS

| 3,684,061 | 8/1972 | Ogawa et al. | 188/73.37 |
| 3,722,634 | 3/1973 | Ogasawara et al. | 188/73.37 |
| 3,885,651 | 5/1975 | Odier | 188/73.37 |
| 3,918,555 | 11/1975 | Rath | 188/73.37 |
| 4,022,302 | 5/1977 | Janssen | 188/73.37 X |
| 4,098,951 | 7/1978 | Wolff | 188/73.35 X |
| 4,373,615 | 2/1983 | Melinat | 188/73.37 X |
| 4,722,424 | 2/1988 | Ikeuchi | 188/73.37 |

FOREIGN PATENT DOCUMENTS

| 2022699 | 11/1975 | Fed. Rep. of Germany . |
| 2508720 | 9/1976 | Fed. Rep. of Germany . |
| 2722194 | 11/1978 | Fed. Rep. of Germany . |
| 2854247 | 6/1980 | Fed. Rep. of Germany . |
| 3339809 | 3/1984 | Fed. Rep. of Germany . |
| 3411233 | 10/1985 | Fed. Rep. of Germany . |
| 8700102 | 6/1987 | Fed. Rep. of Germany . |
| 37387642 | 11/1987 | Fed. Rep. of Germany . |
| 1589118 | 5/1981 | United Kingdom . |

Primary Examiner—Duane A. Reger
Attorney, Agent, or Firm—Barnes & Thornburg

[57] ABSTRACT

A brake arrangement, especially a disk brake for vehicles which includes brake pads guided in a brake caliper on both sides of a brake disk that are operatively connected with hydraulically actuatable actuating pistons. Each actuating piston includes a bore directed toward the brake pad in which an insert member is arranged that includes an element covering the piston end surface and is held with play with respect to the inner circumferential and bottom surfaces of the bore. The element consists of a plate-shaped intermediate inset member which is connected with the two insert members and is provided on its surface facing the brake pad with a friction-increasing layer.

16 Claims, 2 Drawing Sheets

BRAKE ARRANGEMENT

BACKGROUND AND SUMMARY OF THE INVENTION

The present invention relates to a brake arrangement, especially to a disk brake for vehicles with brake pads guided in a brake caliper on both sides of a brake disk which are operatively connected with hydraulically actuatable actuating pistons, whereby each actuating piston includes a bore facing the brake pad in which is arranged an insert member.

Disk brakes can tend to squeak during the braking operation which is caused essentially by an oscillating movement of the brake caliper as well as of the brake pads. Vibrations can occur as a result of these movements at the brake arrangement which radiate a sound that is noticeable to the human ear as so-called "squeaking."

The present invention is concerned with the task to suppress a brake squeaking during a brake actuation.

The underlying problems are solved according to the present invention in that the insert member covering the piston surface and retained with play relative to the inner circumferential and bottom surfaces of the bore consists of a plate-shaped intermediate inset member that is connected with the two insert members.

An embodiment is already described in the German application No. P 37 38 764.2, filed in Germany on Nov. 14, 1987 corresponding to the U.S. patent application No. 270,689, filed Nov. 14, 1988, in which a metallic insert member having substantial mass is retained with play in the hollow actuating piston by way of a flange element on the end surface of the actuating piston. A structurally simple part is achieved thereby which can be inserted into a bore of the actuating piston and suppresses a brake squeaking by a vibration reduction and damping. This damping takes place essentially by a frictional connection between the flange of the insert member and the piston as well a between the flange of the insert member and the back surface of the brake pad.

It has been found in operation that the brake pad carries out movements in the circumferential-, radial- and axial-directions. In order that these movements can be prevented as far-reachingly as possible, because they also excite the brake caliper into vibrations, a plate-shaped intermediate inset member abutting areally at the brake pad is utilized in lieu of a plate-shaped part at the insert member according to the aforementioned German application, which intermediate member is rigidly connected with the two insert members. A movement-impeding action on the brake pad and therewith also on the brake caliper is achieved by this plate-shaped intermediate member having a friction-increasing coating, which extends nearly over the entire back surface of the brake pad and is connected with the insert members. Especially coatings consisting of rubber material contribute thereto, as a result of which a deliberate damping of the circumferential-friction vibrations of the brake pads is achieved and the brake pad noises can be suppressed. In particular a rubber-like layer or a lacquer (paint) layer is arranged on the surface facing the brake pad for the purpose of increasing the friction between the intermediate inset member and the brake pad.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
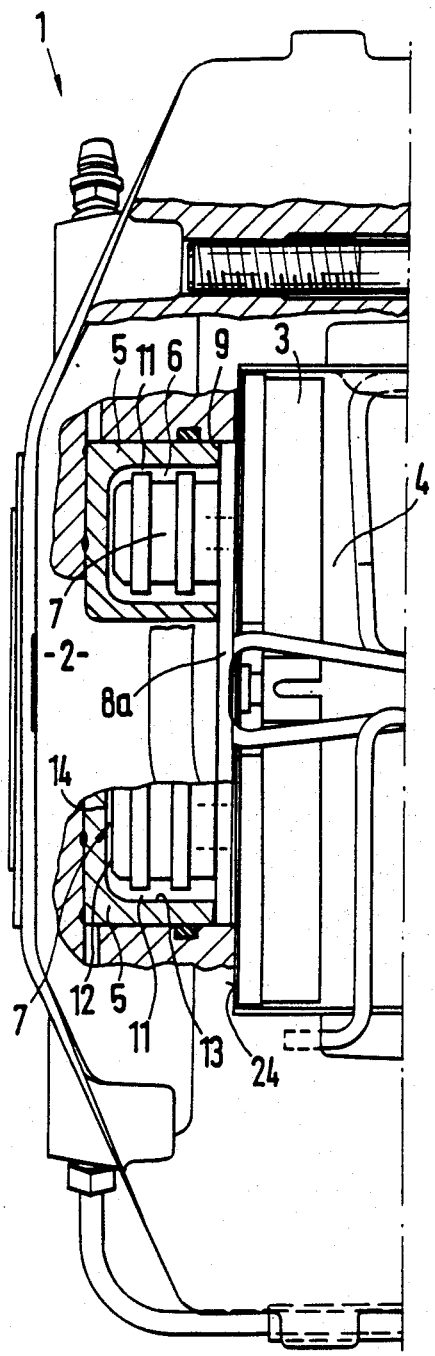
FIG. 1 is a plan view, partly broken away, on a disk brake with actuating pistons and insert members as well as a plate-shaped intermediate member connected with the insert members in accordance with the present invention.
Figure 2:
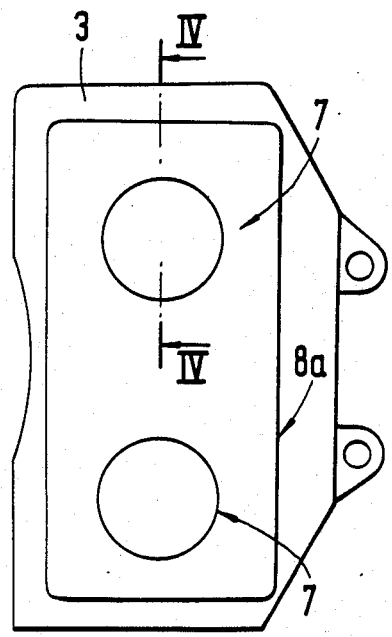
FIG. 2 is a plan view on a plate-shaped intermediate member with insert members.

Referring now to the drawing wherein like reference numerals are used throughout the various views to designate like parts, FIG. 1 illustrates a brake arrangement 1 of a vehicle wheel which includes a brake caliper 2 with guided brake pads 3, between which is arranged a brake disk 4. The brake pads 3 are pressed by way of hydraulically actuatable actuating pistons 5 against the brake disk 4 during the braking operation. A concentric bore 6 directed toward the brake pad 3 is provided in each actuating piston 5, in which a cylindrically shaped insert member 7 is arranged. The insert member 7 includes at its forward end directed toward the brake pad 3 an element covering the piston end surface 9 in the form of a plate-shaped intermediate inset member 8a which is disposed directly opposite the rear brake pad surface 24. The insert member 7 is retained in the bore 6 with a radial play 11 with respect to the inner circumferential surface 13 and with an axial play 12 with respect to the bottom surface 14, whereby it is supported in the direction toward the piston end surface 9 by way of the plate-shaped intermediate member 8a.

The intermediate layer 8a is connected with both insert members 7, for example, by riveting, screws, bonding or similar connecting methods, respectively, by a form-locking connection.

In particular, the intermediate member 8a consists of a metallic material and is coated on both sides with thin friction-increasing layers such as, for example, rubber layers 22 and 23 or lacquer (paint) layers.

The size of the intermediate inset member 8a corresponds approximately to the back surface 24 of the brake pad 3 so that a deliberate damping of circumferential-frictional vibrations of the brake pad 3 is achieved.

Figure 4:
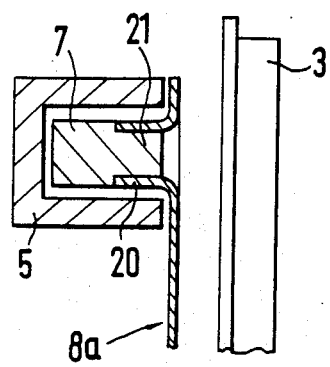
FIG. 4 is a cross-sectional view through a further modified embodiment with a plate-shaped intermediate member form-lockingly retained on the insert member in accordance with the present invention.
Figure 5:
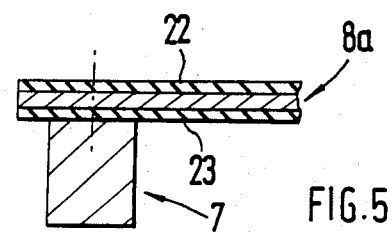
FIG. 5 is a cross-sectional view taken along line V—V of FIG. 2.

The connection of the plate-shaped intermediate inset member 8a can also take place by way of a form-locking connection between the insert member and the intermediate member 8a. For that purpose, the intermediate member 8a includes a sleeve-shaped pressed-out portion 20 that clampingly extends over a forward offset cylindrical area 21 of the insert member 7, as shown more fully in FIG. 4.

Figure 3:
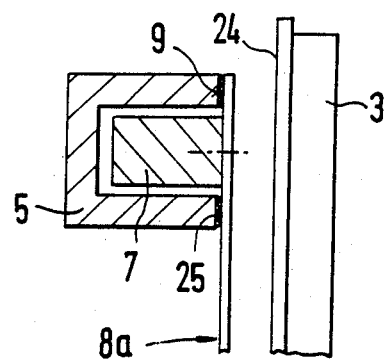
FIG. 3 is a cross-sectional view through another embodiment of a brake arrangement with a surface of the actuating piston toothed at the end face thereof and with an insert member having an intermediate member in accordance with the present invention.

According to a further embodiment, the end surface 9 of the actuating piston 5 may also be provided with a toothed arrangement 25 for increasing the friction, as is shown in FIG. 3.

According to a still further non-illustrated embodiment, the insert member 7 can be covered with a material of increased friction corresponding to the plate-shaped intermediate member 8.

While we have shown and described only several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A brake arrangement for a disk brake of a vehicle comprising:
    brake caliper means;
    brake pad means guided in the brake caliper means on both sides of a brake disc;
    a pair of hydraulically actuated actuating piston means operatively connected with the brake pad means, each actuating piston means of the pair having a bore in a piston end face facing an oppositely disposed brake pad surface of the brake pad means, each bore having both circumferential and bottom surfaces,
    an insert element retained in each bore of the pair of actuating piston means with both radial and axial play with respect to the inner circumferential and bottom surfaces of an associated bore; and
    a plate shaped intermediate means covering the piston end faces of the pair of actuating piston means and connecting each insert element.

2. A brake arrangement according to claim 1, wherein the intermediate means is constructed metallically and is provided at least on the surface facing the back surface of the brake pad means with a friction-increasing coating means.

3. A brake arrangement according to claim 2, wherein the friction-increasing coating means are arranged on both sides of the intermediate means and consist of a rubber-like material.

4. A brake arrangement according to claim 2, wherein the friction-increasing coating means consists of a paint layer.

5. A brake arrangement according to claim 1, wherein the intermediate means is securely connected with the insert members and has approximately a size corresponding to the back surface of the brake pad means.

6. A brake arrangement according to claim 1, wherein the plate-shaped intermediate means is form-lockingly connected with at least one of the insert members in such a manner that a sleeve-like pressed-out portion in the intermediate means clampingly extends over a forward offset cylindrical area of the insert member.

7. A brake arrangement according to claim 1, wherein the piston end surface is provided with toothed means.

8. A brake arrangement for a disk brake of a vehicle comprising:
    brake caliper means;
    brake pad means guide in the brake caliper means on both sides of a brake disk;
    a pair of hydraulically actuated actuating piston means operatively connected with the brake pad means, each actuating piston means of the pair having a bore in a piston end face facing an oppositely disposed brake pad surface of the brake pad means, each bore having both circumferential and bottom surfaces;
    an insert element retained in each bore of the pair of actuating piston means with both radial and axial play with respect to the inner circumferential and bottom surfaces of an associated bore; and
    a plate shaped intermediate means covering the piston end faces of the pair of actuating piston means and connecting each insert element, the intermediate means being provided at least on one surface with a friction increasing coating means.

9. A brake arrangement according to claim 8, wherein the friction-increasing coating means are arranged on both sides of the intermediate means.

10. A brake arrangement according to claim 8, wherein the friction-increasing coating means consists of a paint layer.

11. A brake arrangement according to claim 8, wherein the intermediate means is securely connected with the insert members.

12. A brake arrangement according to claim 8, wherein the plate-shaped intermediate means is form-lockingly connected with at least one of the insert members in such a manner that a sleeve-like pressed-out portion in the intermediate means clampingly extends over a forward offset cylindrical area of the insert member.

13. A brake arrangement according to claim 8, wherein the piston end surface is provided with toothed means.

14. A brake arrangement according to claim 11, wherein the intermediate means is constructed metallically and is provided at least on the surface facing the back surface of the brake pad means with a friction-increasing coating means.

15. A brake arrangement according to claim 14, wherein the friction-increasing coating means are arranged on both sides of the intermediate means.

16. A brake arrangement according to claim 14, wherein the friction-increasing coating means consists of a paint layer.

* * * * *